March 5, 1963  R. E. HEBERT  3,080,062
FILTERS
Filed Jan. 22, 1959  2 Sheets-Sheet 1
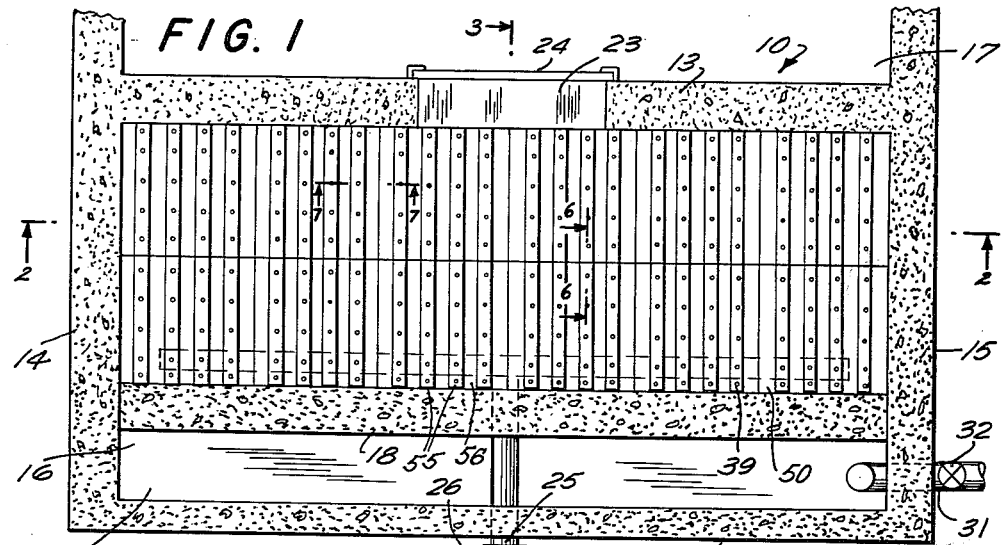
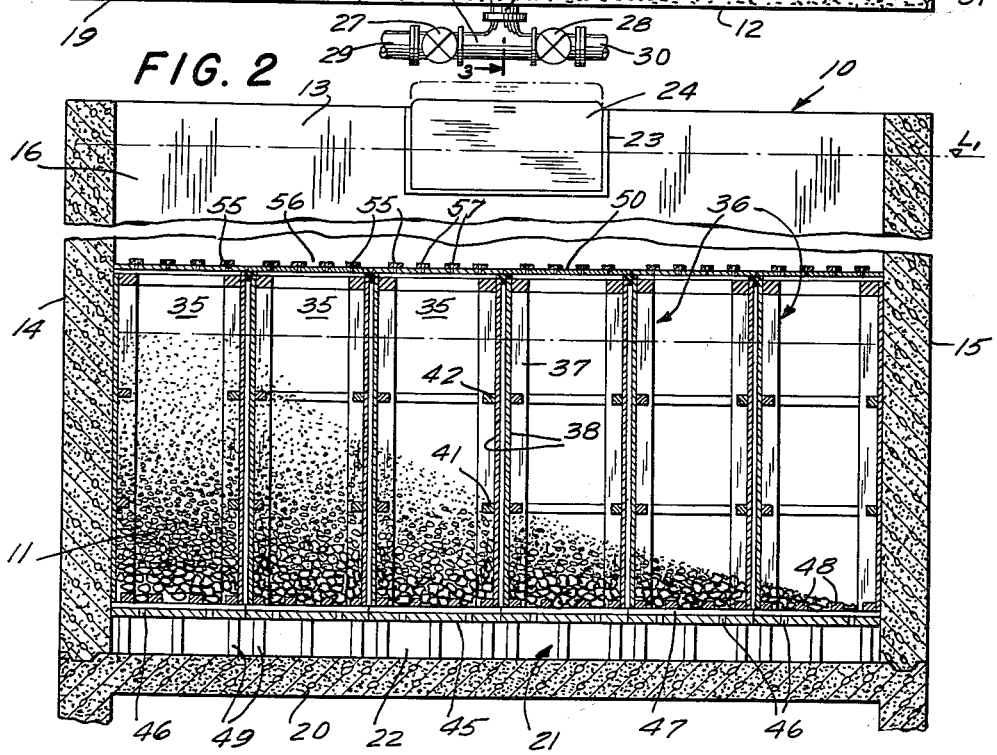
INVENTOR.
RAYMOND E. HEBERT
BY
Curtis, Morris & Safford
ATTORNEYS March 5, 1963 R. E. HEBERT 3,080,062
FILTERS
Filed Jan. 22, 1959 2 Sheets-Sheet 2

INVENTOR.
RAYMOND E. HEBERT
BY Curtis, Morris & Safford
ATTORNEYS

United States Patent Office 3,080,062
Patented Mar. 5, 1963

3,080,062
FILTERS
Raymond E. Hebert, 91 Longacre Road,
Rochester 21, N.Y.
Filed Jan. 22, 1959, Ser. No. 788,344
9 Claims. (Cl. 210—275)

The present invention relates to improvements in filters of the type used to filter large quantities of water or other liquids. Most filters used for this purpose in municipal water systems and the like are of the "rapid-sand" gravity type and the invention will be illustrated and described as applied to such a filter. However, it is to be understood that the invention also is applicable to other types of filters and filters using other filtering materials than sand and gravel as, for example, those using crushed anthracite coal and other granular particles as a filtering medium.

Rapid-sand filters comprise a structure for enclosing a filter bed through which the liquid to be filtered flows by gravity. The filter bed is supported on a foraminous platform above a floor and comprises graded particles of gravel and sand which decrease in size from the platform to the top of the bed where a very fine grade of sand is used. As the liquid passes through the filter bed by gravity solid particles which cannot pass between the grains of sand are filtered therefrom at the top of the filter bed. After a period of use, the accumulation of filtered solids tends to clog the filter which decreases the quantity of water passing therethrough and also impairs filtering properties of the sand.

The filter beds of such rapid-sand filters are periodically cleaned by back-washing to remove the filtered residue. This is accomplished by interrupting the filtering operation and forcing water upwardly through the filter bed at a relatively rapid rate from the chamber between the foraminous platform and floor. The wash water flows upwardly through the sand of the filter bed and agitates the sand particles to flush the filtered particles therefrom. During such washing the flow of wash water displaces and separates the particles of sand and filtered solids and causes the filter bed to expand.

One of the problems common to rapid-sand type filters is the unequal distribution of the wash water as it flows through the filter bed and the lateral shifting of the granular filtering material. It is impossible from a practical standpoint to lay the granular filtering materials so as to produce exactly the same resistance to flow of wash liquid through all areas of the filter bed. As a result, the wash liquid is apt to flow through the filter bed in localized streams at the places where the resistance to flow is the lowest. As the water flows upwardly through the filter bed it lifts and separates the sand particles in the top layer where the resistance to flow is the lowest. Such separation of the sand particles further reduces the resistance to flow and the separated sand particles are apt to be displaced laterally. Over a period of time, the lateral shifting of the filtering material of the bed is apt to increase progressively with a reduction in the thickness of the filter bed in certain areas which further reduces the resistance to flow and increases the tendency to flow in localized streams. Furthermore, the velocity resulting from the flow of wash water in a localized stream may actually lift the coarser aggregate below the layer of sand and displace it laterally, which even further decreases the resistance to flow. Thus, the back wash water does not clean the filter bed uniformly and the uneven filter bed resulting from such a cleaning operation does not uniformly filter the liquid flowing downwardly therethrough.

One of the objects of the present invention is to provide an improved construction in a filter which produces a more uniform distribution and flow of the wash liquid throughout all areas of the filter bed.

Another object is to provide an improved construction in a rapid-sand filter which decreases the lateral shifting of the granular filtering material.

Another object is to control the flow of wash water from each of a plurality of separate adjacent areas to produce a uniform flow through all areas of the filter bed.

Still another object is to provide an improved construction in a rapid-sand filter which is of a simple and compact construction adapted for economical manufacture, and one which is reliable in operation to prevent channeling of wash water and lateral shifting of the filtering material.

These and other objects will become more apparent from the following description and drawings in which like reference characters denote like parts throughout the several views. It is to be expressly understood, however, that the drawings are for the purpose of illustration to teach one skilled in the art how to practice the invention and are not a definition of the limits of the invention, reference being had for this purpose to the appended claims.

In the drawings:

FIGURE 1 is a plan view of a rapid-sand filter unit incorporating the novel features of the present invention and showing the perforated closures overlying the filter bed;

FIGURE 2 is a sectional view taken on line 2—2 of FIGURE 1 and showing the partitions dividing the filter bed into a row of adjacent filter cells and the perforated closure overlying the top of each cell;

Figure 3:
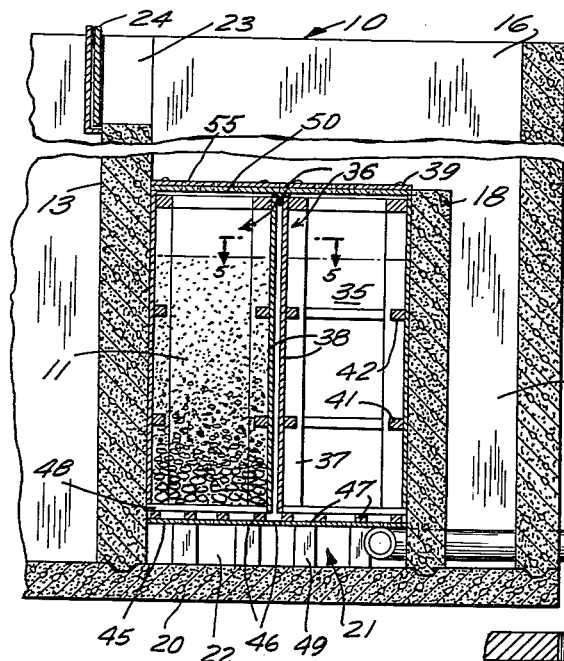
FIGURE 3 is a sectional view taken on line 3—3 of FIGURE 1 to show the filter cells of adjacent rows and the gullet wall forming the spillway into which the wash water and sediment drain during back-washing.
Figure 5:
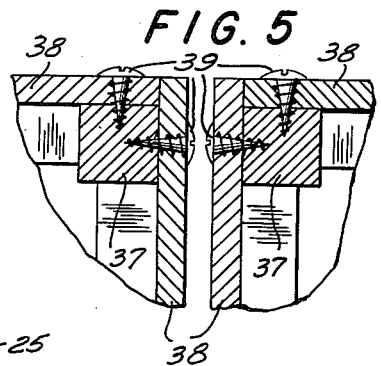
FIGURE 5 is a sectional plan view taken on line 5—5 of FIGURE 3 to show the construction at the corners of two adjacent box like frames.

Referring now to the drawings, the present invention is shown applied to a rapid-sand type filter unit 10 having a structure for enclosing a filter bed 11. The filter unit 10 may have other forms and shapes; but for the purpose of describing and illustrating the invention, a simplified filter unit is shown in the drawings.

Suffice it to state herein that the filter unit 10 has opposed side walls 12 and 13 and end walls 14 and 15 to form an enclosure 16, see FIGURE 1. The end walls 14 and 15 project beyond the side wall 13 to provide a reservoir 17 for water to be filtered. A gullet wall 18 of less height than the side walls 12 and 13 extends between the end walls 14 and 15 adjacent the side wall 12 to provide a spillway drain 19 in the enclosure 16. The filter unit 10 also has a bottom wall 20, see FIGURES 2 and 3, and a foraminous false bottom or platform 21 supported thereon in spaced relation thereto to provide a chamber 22 therebetween. The filter bed 11 is supported on the foraminous platform 21 and comprises graded gravel and sand which decreases in particle size from the bottom upwardly toward the top of the bed with the top layer of the filter bed composed of fine sand.

As shown in FIGURES 1 and 3, the side wall 13 of the filter unit 10 has a gate 23 through which water to be filtered flows to the enclosure 16 from the reservoir 17. Gate 23 is opened and closed by a gate valve 24 which may be slid upwardly, as illustrated by dot and dash lines in FIGURE 2, to supply water to the enclosure 16 or slid downwardly, as indicated by full lines in FIGURE 1, to close the gate. The water to be filtered flows through the filter bed 11 and the foraminous false bottom 21 into the chamber 22 and then from the chamber through an outlet pipe 25 for delivery to a storage vessel or other place where it is to be used.

The end of the outlet pipe 25 has a T-fitting 26 with valves 27 and 28 for opening and closing the branch lines 29 and 30, respectively. For example, branch line 29 is attached to deliver the filtered water to a storage vessel or place where it is to be used when the valve 27 is opened; and branch 30 is adapted to supply water under pressure to chamber 22 to back-wash the filter bed 11 when the valve 27 is closed and the valve 28 is open. Similarly, a drain pipe 31 is provided at the bottom of the spillway 19 for draining wash water and filtered solids removed from the filter bed to any place of disposal, such as a sewer, and the drain pipe 31 is controlled by a valve 32.

In accordance with the present invention the filter bed 11 is divided by partitions into a plurality of adjacent filter cells of a small cross-sectional area to limit the lateral shifting of granular filtering medium during a back-washing operation to the area of each cell. In addition, a structure is provided for each filter which increases the resistance to flow as the rate of flow increases to maintain a more uniform flow through each cell. The structure for controlling the rate of flow from each cell is in the form of a pervious closure at the top thereof and having restrictive outlets for regulating the flow of backwash liquid therethrough by producing a back pressure in the cell which is functionally related to the rate of flow.

In the illustrated embodiment the partition walls for each cell 35 are formed by a rectangular box-like frame 36. The frames 36 are arranged in side by side relation in adjacent rows. The filter unit 10 illustrated in FIGURE 1, has two adjacent parallel rows of frames 36 with six frames in each row.

Each frame 36 comprises corner posts 37, see FIGURES 2 to 5, with panels 38 at each side attached to the corner posts by means of suitable fasteners, such as screws 39. Stringers 40 extend between the top of adjacent corner posts 37 to which the upper edges of the panels 38 are connected by screws 39, see FIGURE 6. Vertically spaced ribs 41 and 42 extend between corner posts 37 and are attached to the panels 38 and project inwardly therefrom. The corner post 37, panels 38, stringers 40 and ribs 41 and 42 are preferably made of a rot-resisting, non-corrosive material, such as "transite" composed of Portland cement and asbestos fill.

Each cell 35 extends upwardly from the foraminous platform 21 through the filter bed 11 and above the top thereof. With a filter bed 11 five feet deep, the frames 36 should project at least 12 inches above the top of the filter bed. This spacing allows for expansion of the granular filtering material a distance of six inches and provides an additional six inches between the top of the expanded filter bed and the top of the frames.

The foraminous platform 21 of the filter unit 10 also is constructed in separate sections or units which are of a size corresponding to the cross-sectional area of the cell frames 36 and are individually set in place. Each section of the platform 21 comprises a rectangular plate 45 having uniformly spaced holes 46 formed therein of such a large diameter as to avoid clogging and minimize frictional resistance to the flow of water upwardly therethrough. Baffle strips 47 are mounted in spaced relation on each plate 45 and similar baffle strips 48 are mounted in spaced relation over the strips 47 at right angles thereto to hold the filtered gravel away from the holes 46 and allow free flow of the liquid into and from the chamber 22 underlying the plates 45. Baffle strips 47 and 48 are of less length than the width of the rectangular plate 45 to fit into the bottom end of a frame 36 and the bottom edges of the panels 38 of a frame are connected to the ends of the baffle strips by means of fastening screws 39, see FIGURE 4. Each rectangular plate 45 is supported above the bottom wall 20 of the filter unit 10 by legs 49 and one of the legs for each platform may be adjustable to compensate for irregularities in the bottom wall. Thus, a plurality of the box like frames 36 are mounted in the enclosure 16 of the filter unit 10 as individual self contained units and they divide the basin into a plurality of adjacent rows of cells 35 with a common chamber 22 underlying all of the rectangular plates 45 of the individual cells and forming the platform 21.

After the plurality of frames 36 have been assembled in the enclosure 16, the individual cells 36 are filled with the graded filtering material of substantially the same composition in each of the cells. The filtering material comprises an underlying layer of coarse aggregate of gradually increasing fineness from the bottom toward the top with a layer of fine sand at the top. Even though considerable care is taken in laying down the filter bed 11 the resistance to flow through the individual cells 35 will vary from cell to cell.

Figure 6:
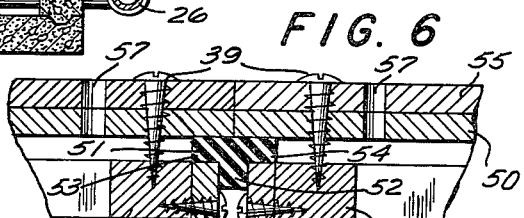
FIGURE 6 is a sectional view taken on line 6—6 of FIGURE 1 to show the manner of attaching the perforated top closures to the box like partition frames and the gaskets between the adjacent frames and closures of a row.
Figure 4:
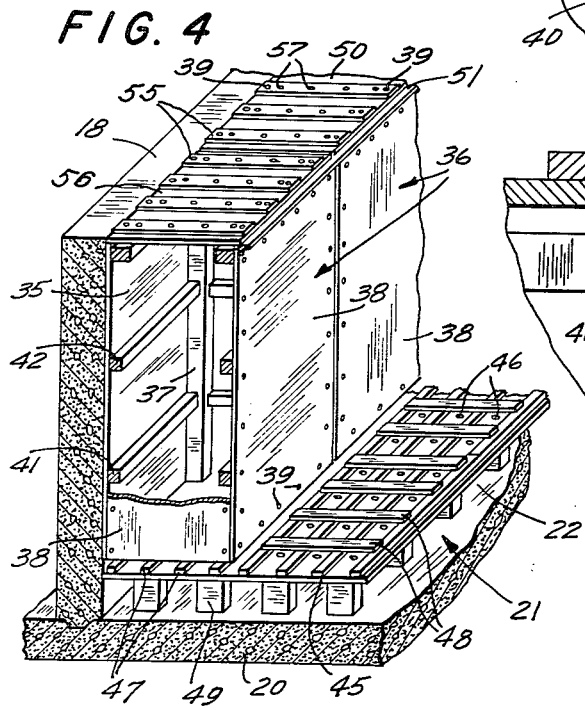
FIGURE 4 is a sectional perspective view of a portion of the filter unit to show the construction of the box like frames for dividing the filter bed into separate filter cells.
Figure 7:
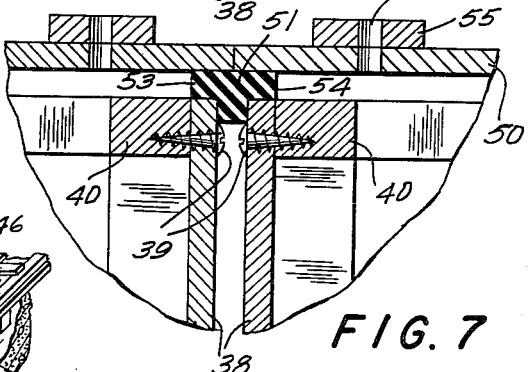
FIGURE 7 is a view similar to FIGURE 6 taken on line 7—7 of FIGURE 1 to show the gaskets between the rows of box like frames and the top closure.

The flow of back-wash water from each cell 35 is controlled by a perforated closure plate 50 at the top of each frame 36. The closure plate 50 for each individual cell 35 overlies the top stringers 40 of its frame 36 and is attached thereto by means of fastening screws 39, see FIGURE 6. T-shaped gaskets 51 of a compressible resilient material, such as rubber, are provided between adjacent frames 36 and the closure plates 50. As shown in FIGURE 6, one flange 52 of each gasket 51 is positioned between adjacent frames 36, a second flange 53 is positioned between one frame and its closure plate 50 and a third flange 54 is positioned between the adjacent frame 36 and its closure plate. The gaskets 51 extend longitudinally between adjacent frames 36 of adjacent rows, as illustrated in FIGURE 6, and transversely between adjacent frames of each row, as illustrated in FIGURE 7. Thus, the gaskets 51 prevent leakage of backwash liquid upwardly between adjacent frames 36 and laterally between the top edges of the frames and the closure plates 50.

As illustrated in FIGURES 1 and 2, each closure plate 50 has strips 55 attached to the top thereof in spaced parallel relationship to provide alternate raised surfaces forming gutters 56 therebetween. The closure plates 50 each have rows of holes 57 extending through the plate and strips 55 so that wash-water issuing from the holes flows into the gutters 56. The frames 36 are of such a height as to align the top closure plates 50 with the top of the gullet wall 18 with the strips 55 projecting upwardly above the wall so that wash-water in the gutters 56 flows over the top of the wall into the spillway 19.

The holes 57 in each closure plate 50 are of such number and size as to produce a predetermined resistance and pressure drop therethrough at the particular desired rate of flow. Thus, if the resistance of the filter bed 11 in any particular cell 34 is lower than the average resistance in the other cells, a larger quantity of water will tend to channel through that particular cell. However, the perforated closure plate 50 resists the flow of water therethrough at the increased rate. As only a fixed quantity of back-wash liquid will flow through the perforations or holes 57 at a particular pressure, an increased rate of flow will produce a back pressure in that particular cell 35 which compensates for the lower resistance of the filter bed. On the other hand, if the resistance of the filter bed 11 in any particular cell 34 is higher than the average resistance in the other cells, the rate of flow therethrough is reduced. However, with a lesser quantity of liquid flowing through the cell, the resistance and pressure drop through the perforated closure plate 50 decreases to compensate for the higher resistance of its filter bed. Thus, the perforated closure plates 50 tend to equalize the pressure drop through each of the cells 35 so as to produce a more uniform flow through all of the cells and prevent channeling through only a few of the cells. Furthermore, the rate of flow and velocity of the water in any particular cell is maintained within predetermined limits to prevent excessive displacement of the filter bed in any particular cell which would tend to further decrease the resistance and pressure drop through its filter bed. As the rate of flow through each cell is controlled, the rate of flow through all of the cells is controlled to maintain a uniform flow through all areas of the filter unit 10. One form of apparatus having now been described in detail, the mode of operation of the filter unit 10 is now described.

When the filter unit 10 is operating on a filtering cycle the valve 32 in the drain pipe 31 and the valve 28 in branch line 30 are closed and the valve 27 in the branch line 29 and the gate valve 24 are open. Water to be filtered then flows from the reservoir 17 through the gate 23 into the enclosure 16 and fills to some level L1, see FIGURE 2, corresponding to the level in the reservoir 17. The water to be filtered flows through the perforated closure plates 50 into the cells 35 and downwardly through the filter bed 11 in each cell and foraminous platform 21 into the chamber 22. As the liquid flows through the interstices between the adjacent grains of the filtering medium, particulate matter is strained from the liquid and held by the filtering medium. The filtered liquid then flows from the chamber 22 through the outlet pipe 25, T connection 26 and branch line 29 to a storage vessel or place where it is to be used. After a period of time the filter bed 11 may become choked with the filtered material which reduces the capacity of the filter as well as its efficiency. It is then necessary to wash the filter.

To wash the filter bed 11 the valve 27 in the branch line 29 and the gate valve 24 are closed and the drain valve 32 is opened. The water in the enclosure 16 then flows through the drain line 31 to the level of the gullet wall 18 and empties the spillway 19. Valve 28 in branch line 30 then is opened and clean wash water is pumped into the chamber 22 through the branch line 30. The wash water flows upwardly from the chamber 22 through the individual cells 35 of the filter bed 11 and holes 57 in the perforated closure plates 50 and along the gutters 56 at the top of the closure plates and over the gullet wall 18 into the spillway 19. Wash liquid is supplied at a rate to cause it to rise through the filter unit 10 at the required rate to flush the filtered material from the filtering medium as, for example, at a rate of rise from 24 to 36 inches per minute. The flow of wash water through the filter bed 11 at this rate agitates and expands the sand in the top layer to break up the accumulated filtered solids and separate this material from the sand. The filtered material has a lesser density than the sand and the rate of flow is such as to maintain it in suspension. During a back-washing cycle the upward flow of the wash water through the individual cells causes the filter bed to expand as much as 6 inches above its normal level and provide a 6 inch space between the expanded bed and perforated closure plate 50. The spaced ribs 41 and 42 projecting inwardly from the side panels 38 of each cell 35 prevent the back-wash water from flowing up the side walls where the resistance is less and bypassing the main body of the filter bed.

As the wash liquid leaves the filter bed 11 with the filtered material suspended therein it flows through the holes or perforations 57 in the closure plates 50. If the wash water flows through the filtering medium 11 in a particular cell 35 at a relatively slow rate, due to its higher resistance to flow, the closure plate 50 produces a minimum pressure drop. However, if the rate of flow through the filtering medium in a particular cell 50 is high, the resistance to flow and pressure drop through the perforated closure plate 50 increases. Thus, the closure plate 50 produces a back pressure functionally related to the high rate of flow through its cell 35 tending to maintain the rate of flow substantially constant. As a result, the rate of flow tends to be uniform through all of the cells. Furthermore, the more uniform rate of flow prevents excessive displacement of the filtering medium and limits such displacement to its particular cell.

As the wash liquid flows through the holes 57 in each closure plate 50 it spouts therefrom in the form of jets of a height corresponding to the pressure in the particular cell 35. The wash water with the filtered material therein then flows into the gutters 56 between adjacent strips 55 and flows along the gutters over the top of the gullet wall 18 into the spillway 19 and from the spillway through the drain line 31 to a sewer or other place of disposal. The back-wash operation is continued until all of the filtered material has been removed from the sand and clean water is issuing from the closure plates 50. The valve 32 in drain line 31 then is closed, the back-wash supply line 30 is closed by the valve 28, the outlet line 29 for filtered water is opened by the valve 27 and the gate valve 24 is opened to initiate a new filtering cycle.

It will now be observed that the present invention provides an improved construction in a filter which controls the flow of wash water from each of a plurality of separate adjacent sections of the filter to produce a more uniform distribution and flow of the wash water throughout the entire area of the filter bed. It also will be observed that the present invention provides an improved construction in a rapid-sand filter which decreases the lateral shifting of the granular filtering material. It will still further be observed that the present invention provides an improved construction in rapid-sand filters which is of simple and compact construction, adapted for economical manufacture and reliable in operation to prevent channeling of wash water during a washing operation.

While a single embodiment of the invention is herein illustrated and described, it will be understood that changes may be made in the construction and arrangement of elements without departing from the spirit or scope of the invention. Therefore, without limitation in this respect, the invention is defined by the following claims:

1. In a filter unit of the type having an enclosing structure for a filter bed of granular material supported on a foraminous platform to provide a chamber thereunder and which is cleaned by a fluid system for producing a back flow of fluid from the chamber upwardly through the filter bed, the combination with such a filter unit of an arrangement to avoid channeling of the wash fluid at high velocity in localized streams and lateral displacement of the granular material of the filter bed during cleaning comprising impervious partition walls extending upwardly from the foraminous platform through and above the filter bed to divide the filter bed into separate adjacent cells and provide an expansion chamber at the top of each cell for expansion of granular material, a perforated cover overlying the top of and sealed to the partition walls of each cell to restrict the flow of wash fluid therefrom, and the covers for the plurality of cells each having perforations of a number and cross-sectional area to produce a predetermined resistance to flow from each of the cells at a particular desired rate of flow whereby to produce a uniform flow from the chamber through all of the cells.

2. A filter unit comprising an enclosing structure, a bed or granular filtering medium in said enclosing structure, means for delivering liquid to be filtered onto the top of the filter bed for gravity flow therethrough, means for cleaning the filter bed by flowing a wash liquid upwardly therethrough at a particular rate of flow to expand the granular filtering medium, flush the filtered material therefrom and deliver it from the bed in suspension in the flush liquid, impervious partition walls extending upwardly through the entire filter bed and to a height above the top thereof to divide the later into adjacent cells and permit expansion of the filter bed by wash water, and a perforated cover overlying each separate cell and in sealing engagement with the upper edges of the partition walls for said cell to restrict the flow of wash liquid at the particular desired rate of flow therefrom and thereby control the distribution of the wash liquid uniformly through all of the cells over the entire filter bed.

3. A filter unit comprising an enclosing structure having a floor and side walls, one of said side walls having a height less than the others to provide for overflow from one side of the structure, box-like frames mounted in the enclosing structure in side by side relation to divide the entire area of the enclosing structure into a plurality of vertically arranged cells, each box-like frame having impervious side walls and foraminous bottom and top walls, said box-like units being supported above the floor of the enclosing structure to provide a chamber underlying the foraminous bottom walls of all of the frames, a filter bed of granular material in each of the box-like frames, means for supplying wash liquid to the chamber for flow upwardly through the adjacent cells at a rate to expand and clean the filter bed therein, and the foraminous top wall of each frame being located at a level with the overflow wall and having openings of a cross-sectional area to restrict the flow of wash liquid from the cell at the particular desired rate of flow to clean the filter bed whereby to control the flow from all of the frames and produce a uniform distribution and flow of the wash liquid through all of the cells.

4. A filter unit in accordance with claim 2 in which the enclosing structure includes an overflow wall at one side of the filter bed, the cover for each of the cells being located at least as high as the top of the overflow wall, spaced ribs on the top of the cover to form gutters therebetween, said ribs and gutters extending at an angle to the overflow wall, and the perforations in the cover extending through the ribs so that the wash liquid leaving each cell through the perforations flows into and along the gutters at each side and over the overflow wall.

5. A filter in accordance with claim 2 in which the partition walls have ribs projecting into the beds of granular filtering material in each cell to increase the resistance to liquid flow at the face between the granular medium and impervious partition wall.

6. A filter unit in accordance with claim 3 in which gaskets are provided between adjacent box-like frames to prevent the flow of wash liquid between the frames.

7. A filter unit in accordance with claim 6 in which the gaskets are T-shaped and positioned between the upper edges of adjacent frames and between the upper edges of the adjacent frames and the covers.

8. A rapid-sand type filter unit in accordance with claim 3 in which the foraminous bottom wall of each cell is formed by a perforated plate with legs for supporting it above the floor of the enclosing structure, baffle slats mounted in overlying right angular arrangement on the perforated plate, and the filter bed of granular material in each box-like frame comprising gravel of progressively increasing fineness from the foraminous bottom wall upwardly with a layer of fine sand at the top.

9. A rapid-sand type filter unit in accordance with claim 3 in which the foraminous top wall of each box-like frame comprises a plate with a plurality of openings of such size and number as to restrict flow and produce a pressure drop in the stream of wash liquid flowing therethrough, and said foraminous top wall increasing the resistance to flow as the rate of flow increases.

References Cited in the file of this patent

UNITED STATES PATENTS

| Re. 18,970 | Friend | Oct. 17, 1933 |
| 163,814 | Sinclaire | May 25, 1875 |
| 538,720 | Allen | May 25, 1895 |
| 619,755 | Hyatt | Feb. 21, 1899 |
| 2,302,450 | Laughlin | Nov. 17, 1942 |
| 2,384,972 | Smalley | Sept. 18, 1945 |
| 2,745,553 | Riddick | May 15, 1956 |

FOREIGN PATENTS

| 6,682 | France | Dec. 1, 1906 |

(1st addition to Patent No. 360,160)